(No Model.)
J. M. STRATTON.
CLEANSING APPARATUS FOR PAPER MAKING MACHINES.
No. 596,950. Patented Jan. 4, 1898.
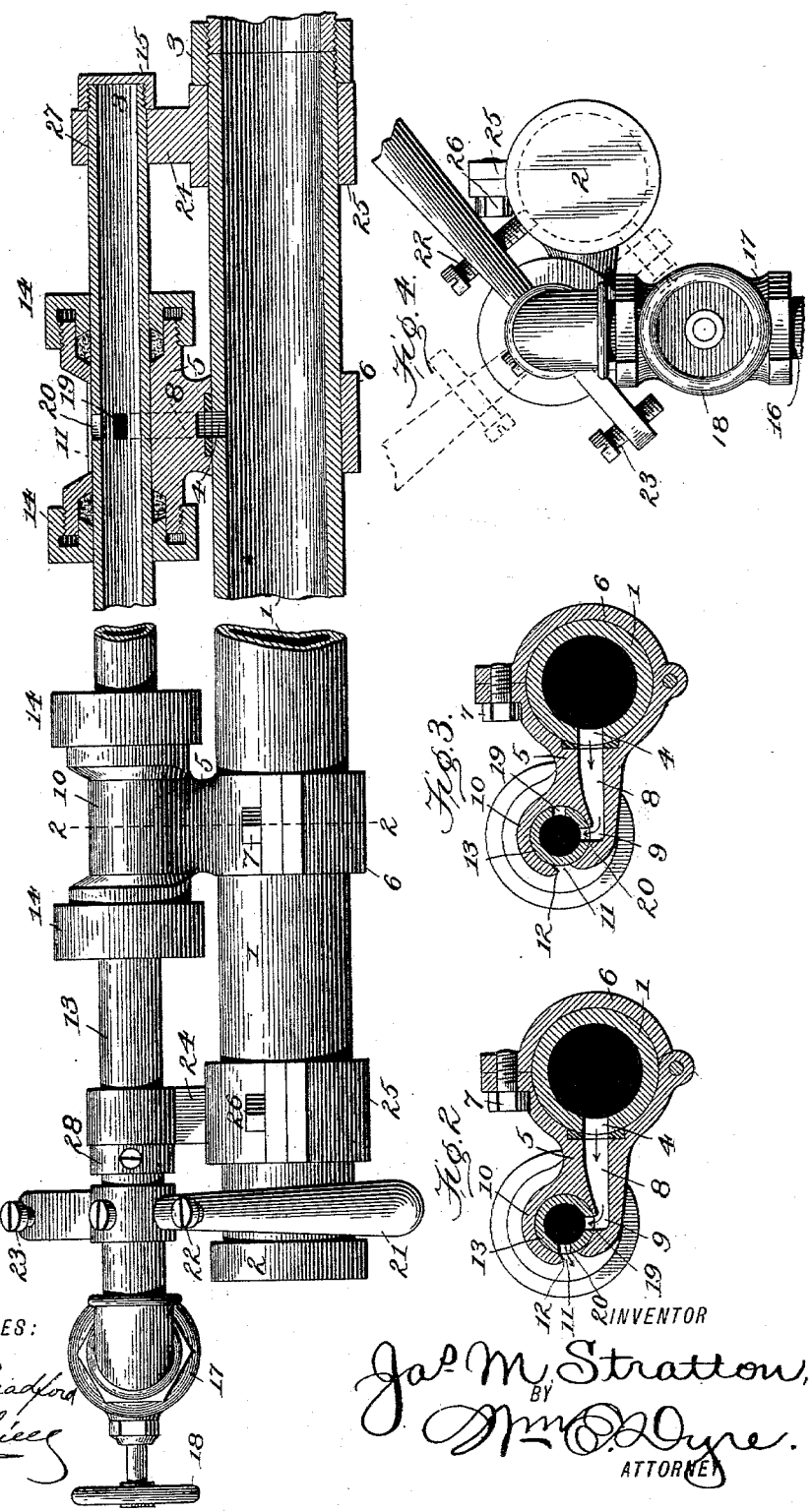
WITNESSES:
INVENTOR
Jas. M. Stratton,
BY
ATTORNEY

UNITED STATES PATENT OFFICE.

JAMES M. STRATTON, OF SALEM, OHIO, ASSIGNOR TO THE DEMING COMPANY, OF SAME PLACE.

CLEANSING APPARATUS FOR PAPER-MAKING MACHINES.

SPECIFICATION forming part of Letters Patent No. 596,950, dated January 4, 1898.

Application filed September 22, 1896. Serial No, 606,665. (No model.)

*To all whom it may concern:*

Be it known that I, JAMES M. STRATTON, a citizen of the United States, residing at Salem, in the county of Columbiana and State of Ohio, have invented certain new and useful Improvements in Cleansing Apparatus for Paper-Making Machines; and I do hereby declare the following to be a full, clear, and exact description of the invention, such as will enable others skilled in the art to which it appertains to make and use the same.

My invention relates to the art of paper-making, having particular reference to machines used in the art and thereunder to cleansing apparatus, including means for cleansing the last-named apparatus itself.

The invention has for its object an improvement upon that made by William H. Millspaugh, designated as "Case A" and filed simultaneously herewith, claiming Letters Patent of the United States covering means for delivering a cleansing fluid in one continuous sheet to parts of a paper-making machine.

To this end my invention contemplates and includes a main supply-pipe, a series of discharge or spraying nozzles in communication therewith, and a rotatable controlling valve rod or plug common to all of the nozzles, the latter being hollow, provided with inlet and outlet ports, as also a discharge-pipe guarded by a gate-valve and having a handle, whereby it is rotated, bearing adjustable stops for limiting such rotation in both directions.

As thus outlined, my invention is transversely located upon the frame of a paper-making machine at any or all points requiring continuous or periodical cleansing, is supplied with water or other liquid from a pump or similar source of forced supply, and is especially designed, arranged, and adapted for operation upon the endless making-wire, the felt conveyers, the dandy-roll, or the gathering-roll of a wet machine. In its application to the first-mentioned wire and felts the invention serves to forcibly project a continuous sheet of water or other cleansing agent upon and through the meshes and texture of these rapidly-traveling parts at their return or lower side, while in its application to the rolls aforesaid the apparatus is placed above and operates in like manner through them from the outside.

The invention will be hereinafter particularly described, and pointed out in the claims following.

In the accompanying drawings, whereon the numerals of reference indicate the same parts wherever employed, Figure 1 is a plan view of my invention, at one end showing the closed supply-pipe, one spraying-nozzle, the hollow continuous valve-rod, a handle and stops for rotating the latter, and a gate-valve, also in alinement, but broken away, and in horizontal section same pipe and rod at its opposite end with one affixed nozzle. Fig. 2 is a vertical central section through one nozzle and adjacent parts on the line 2 2, Fig. 1, in normal position for spraying. Fig. 3 is a view corresponding with Fig. 2, except that the valve-plug has been partially rotated for purposes of disgorging; and Fig. 4 is an end elevation of supply-pipe, the angular end of valve-rod, its stop-bearing handle, gate-valve, and hand-wheel.

Reference being had to the drawings and numerals thereon, 1 represents the main supply-pipe, closed at one end by a cap 2, provided at its opposite or inlet end with a coupling 3, by which communication is established with a source of water-supply and perforated at equidistant intervals by outlets 4. Upon the pipe 1, immediately over its outlets 4, are located a series of spraying-nozzles 5, each having a hinged clamping-base 6, surrounding pipe 1, and there firmly retained by screw 7. These nozzles vary in number according to requirements, but are equidistantly mounted upon the one common pipe, and when applied to a "Fourdrinier" machine are usually located about five inches apart. Each nozzle 5 has cast therein a longitudinal channel 8, having converging walls communicating through outlet 4 with the interior of pipe 1, and at its angular discharge end 9 communicating with the interior of cylindrical valve-chamber 10, as shown by Figs. 2 and 3. The surface of valve-chamber 10 is broken by a discharge-slot 11, milled therethrough at an acute angle to the walls of said chamber, thus furnishing an angular spraying-lip 12, against which water or other liquids forcibly impinges when the apparatus is in use.

Passing directly through all nozzles 5 is a hollow rotatable valve rod or plug 13, suitably packed, as at 14, closed at one end by a screw-cap 15, and finished at its opposite end in a waste-pipe 16, guarded by a gate-valve 17, controlled by a hand-wheel 18. Throughout its length this hollow rotatable valve rod or plug is perforated by inlet and outlet ports 19 and 20, respectively, the former adapted to register with the extremity 9 of channel 8 and the latter with discharge-slot 11. Secured to the end of rod or plug 13, adjacent to its gate-valve 17, is a handle 21, projecting upon both sides and equipped with adjustable screw-stops 22 23 for engaging the surface of pipe 1 to limit rotation in each direction.

By way of supports for the rod 13, in addition to those furnished by nozzles 5 and their stuffing-boxes 14, suitable brackets or hangers 24 are provided, secured to pipe 1 in like manner as the nozzles are secured, each having a hinged clamping-base 25, surrounding the pipe, retained by set-screws 26, and each bearing at its opposite end an eye 27, through which passes the rod. While interposed between one of the hangers 24 and handle 21 is a collar 28, surrounding and fixed to the rod 13, for the purpose of coacting with the cap 15 to prevent longitudinal movement thereof.

This being substantially the construction of my invention, its use and operation are as follows: Presuming the apparatus to be suitably located with reference to the machine or parts of a machine to be operated upon, and presuming, further, that pipe 1 and communicating channels 8 are in direct communication with a supply of clean water (or other liquid) under pressure from a pump, a partial rotation of valve rod or plug 13 through the agency of handle 21 until screw-stop 22 engages the surface of pipe 1, as in Figs. 1, 2, and 4, now serves to establish communication between the interior of pipe 1, all of the channels 8, the interior of valve-rod 13, and finally the angular spraying-lips 12 of discharge-ports 11. Thereupon the water or liquid employed is delivered from all nozzles 5 simultaneously and at uniform pressure in a series of sheets with diverging sides which unite at their common plane of utilization to produce one unbroken sheet as distinguished from a plurality of showers or individual jets. The quality of the spray thus produced will be coarse or fine according to the relative angle of inclination between ports 20 and lips 12, determined by the adjustment of screw-stop 22, as before mentioned, and when it becomes necessary or desirable to disgorge the valve-rod 13 and cleanse the pipe 1 this important operation is accomplished in the following manner: Rotation of rod 13 in the opposite direction from that heretofore described is finally arrested by the engagement of screw-stop 23 with the opposite side of pipe 1, as shown by dotted lines in Fig. 4. The position of ports 19 and 20 with relation to discharge-ports 11 then being as shown by Fig. 3, it is obvious that there is unobstructed communication between the interior of pipe 1 and the interior of rod 13, the discharge-port 11 then being positively closed. Gate-valve 17 now being opened by the aid of hand-wheel 18, it is apparent that the water-supply will be forcibly driven through pipe 1, channels 8, ports 20, the interior of rod or plug 13, and finally conducted off through waste-pipe 16, the several parts in the meantime receiving a vigorous and continuous washing.

The invention being substantially as set forth, what I claim is—

1. In a paper-making machine the combination with a series of nozzles for delivering cleansing liquid in a continuous sheet, of a common hollow valve rod or plug, and means for disgorging the latter, substantially as described.

2. In a paper-making machine the combination with a series of nozzles for delivering cleansing liquid in a continuous sheet, of a common hollow valve rod or plug, and means for diverting the flow from all of said nozzles through the rod or plug, substantially as described.

3. In a paper-making machine the combination with a series of nozzles for delivering cleansing liquid in a continuous sheet, of a hollow rotatable valve rod or plug for controlling the delivery of all nozzles, and a gate-valve for guarding an outlet in said hollow valve rod or plug, substantially as described.

4. In a paper-making machine the combination with a series of nozzles for delivering a cleansing liquid, of a common supply-pipe for the nozzles, a hollow valve rod or plug having inlet and outlet ports communicating with all nozzles, and adjustable stops projected from both sides of said rod for limiting its rotation in each direction, substantially as described.

5. In a paper-making machine the combination with a series of nozzles for delivering a cleansing liquid, of a common supply-pipe for the nozzles, a hollow rotatable valve rod or plug common to all nozzles, and a handle for rotating said rod or plug bearing adjustable stops for contacting with the supply-pipe to limit rotation in both directions, substantially as described.

In testimony whereof I subscribe my signature in presence of two witnesses.

JAMES M. STRATTON.

Witnesses:
CHARLES O. ROGERS,
FRED J. EMERY.